United States Patent
Mitsunaga

(10) Patent No.: US 7,870,328 B2
(45) Date of Patent: Jan. 11, 2011

(54) MEMORY CONTROLLER AND FLASH MEMORY SYSTEM

(75) Inventor: Takuma Mitsunaga, Tokyo (JP)

(73) Assignee: TDK Corporation, Tokyo (JP)

( * ) Notice: Subject to any disclaimer, the term of this patent is extended or adjusted under 35 U.S.C. 154(b) by 938 days.

(21) Appl. No.: 11/787,734

(22) Filed: Apr. 17, 2007

(65) Prior Publication Data

US 2007/0245070 A1   Oct. 18, 2007

(30) Foreign Application Priority Data

Apr. 17, 2006   (JP) .............................. 2006-113395

(51) Int. Cl.
*G06F 12/00* (2006.01)

(52) U.S. Cl. .................... 711/103; 711/4; 711/100; 711/102; 711/168; 365/220; 365/221; 365/230.01; 365/230.02; 365/230.03

(58) Field of Classification Search ................. 711/100, 711/102–103, 168; 365/220–221, 230.01, 365/230.03
See application file for complete search history.

(56) References Cited

U.S. PATENT DOCUMENTS

| | | | | |
|---|---|---|---|---|
| 5,890,192 | A * | 3/1999 | Lee et al. ............... | 711/103 |
| 6,570,785 | B1 * | 5/2003 | Mangan et al. ......... | 365/185.02 |
| 7,627,712 | B2 * | 12/2009 | Sanders et al. .......... | 711/103 |
| 2003/0033573 | A1 | 2/2003 | Tamura et al. | |
| 2005/0141313 | A1 * | 6/2005 | Gorobets et al. ........ | 365/222 |
| 2005/0144516 | A1 * | 6/2005 | Gonzalez et al. ........ | 714/8 |

FOREIGN PATENT DOCUMENTS

| | | |
|---|---|---|
| JP | 2003-058431 A | 2/2003 |
| JP | 2005-018490 | 1/2005 |
| JP | 2006-040484 A | 2/2006 |

OTHER PUBLICATIONS

English language abstract for JP 2003-058431 extracted from espacenet.com database, dated Nov. 15, 2010, 21 pages.
English language translation and abstract for JP 2006-040484 extracted from PAJ database, 23 pages.

* cited by examiner

*Primary Examiner*—Tuan V Thai
*Assistant Examiner*—Zhuo H Li
(74) *Attorney, Agent, or Firm*—Howard & Howard Attorneys PLLC

(57) ABSTRACT

When a free physical block where data is to be written is searched for, a search process for searching for a pair of free physical blocks is first executed using a free physical block search table. Detection of a free non-pair good block is executed only when a pair of free physical block is not detected in the search process using the free physical block search table. When there is a free physical block, two-plane write is executed. When there is no pair of free physical blocks, data is written in an adequately combined non-pair good blocks.

6 Claims, 11 Drawing Sheets

ADDRESS TRANSLATION TABLE

| LZBN | PAIR FLAG | PZBN |
|---|---|---|
| #0 | 0 | #22 |
| #1 | 0 | #12 |
| #2 | 0 | #6 |
| #3 | 0 | #28 |
| #4 | 1 | #8 |
| #5 | 0 | #44 |
| #6 | 0 | #52 |
| #7 | 0 | #36 |
| ... | ... | ... |
| #497 | 0 | #1000 |
| #498 | 0 | #880 |
| #499 | 0 | #1020 |

DUMMY PAIR TABLE
300

| PZ BN | PZ BN |
|---|---|
| # 8 | # 15 |

FIG. 5

FREE PHYSICAL BLOCK SEARCH TABLE
100

PZBN

| | |
|---|---|
| # 14, # 12, ···, # 2, # 0 | 0000 0000 |
| # 30, # 28, ···, # 18, # 16 | 0000 0000 |
| # 46, # 44, ···, # 34, # 32 | 0000 0000 |
| # 62, # 60, ···, # 50, # 48 | 0001 1000 |
| # 78, # 76, ···, # 66, # 64 | 0000 0000 |
| # 94, # 92, ···, # 82, # 80 | 0000 0100 |
| # 110, # 108, ···, # 98, # 96 | 0000 0000 |
| # 126, # 124, ···, # 114, # 112 | 0000 0000 |
| | ··· |
| # 990, # 988, ···, # 978, # 976 | 0000 0000 |
| # 1006, # 1004, ···, # 994, # 992 | 0000 0000 |
| # 1022, # 1020, ···, # 1010, # 1008 | 0000 0000 |

FIG. 6

NON-PAIR GOOD BLOCK TABLE
200

| PZBN |
|---|
| # 20 |
| # 35 |
| # 48 |
| ... |

FIG. 10
PRIOR ART

| PLANE #0 | | | | PAGE NUMBER PN | PLANE #1 | | | |
|---|---|---|---|---|---|---|---|---|
| SECTOR NUMBER #0 | SECTOR NUMBER #1 | SECTOR NUMBER #2 | SECTOR NUMBER #3 | #0 | SECTOR NUMBER #4 | SECTOR NUMBER #5 | SECTOR NUMBER #6 | SECTOR NUMBER #7 |
| SECTOR NUMBER #8 | SECTOR NUMBER #9 | SECTOR NUMBER #10 | SECTOR NUMBER #11 | #1 | SECTOR NUMBER #12 | SECTOR NUMBER #13 | SECTOR NUMBER #14 | SECTOR NUMBER #15 |
| SECTOR NUMBER #16 | SECTOR NUMBER #17 | SECTOR NUMBER #18 | SECTOR NUMBER #19 | #2 | SECTOR NUMBER #20 | SECTOR NUMBER #21 | SECTOR NUMBER #22 | SECTOR NUMBER #23 |
| ⋮ | ⋮ | ⋮ | ⋮ | ⋮ | ⋮ | ⋮ | ⋮ | ⋮ |
| SECTOR NUMBER #488 | SECTOR NUMBER #489 | SECTOR NUMBER #490 | SECTOR NUMBER #491 | #61 | SECTOR NUMBER #492 | SECTOR NUMBER #493 | SECTOR NUMBER #494 | SECTOR NUMBER #495 |
| SECTOR NUMBER #496 | SECTOR NUMBER #497 | SECTOR NUMBER #498 | SECTOR NUMBER #499 | #62 | SECTOR NUMBER #500 | SECTOR NUMBER #501 | SECTOR NUMBER #502 | SECTOR NUMBER #503 |
| SECTOR NUMBER #504 | SECTOR NUMBER #505 | SECTOR NUMBER #506 | SECTOR NUMBER #507 | #63 | SECTOR NUMBER #508 | SECTOR NUMBER #509 | SECTOR NUMBER #510 | SECTOR NUMBER #511 |

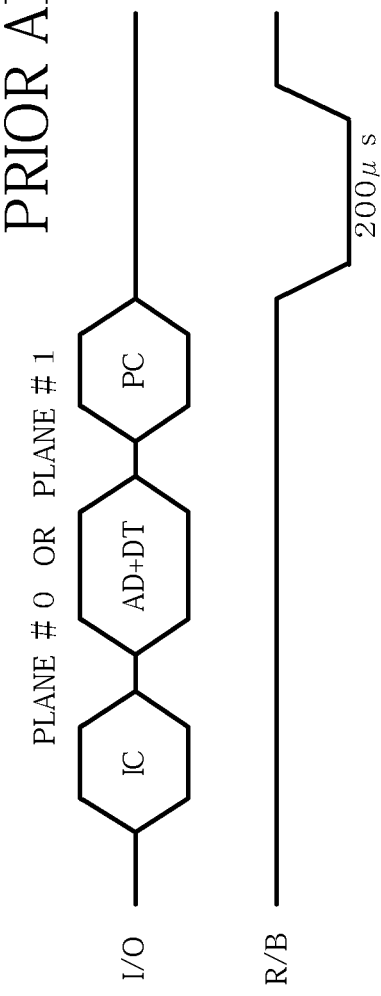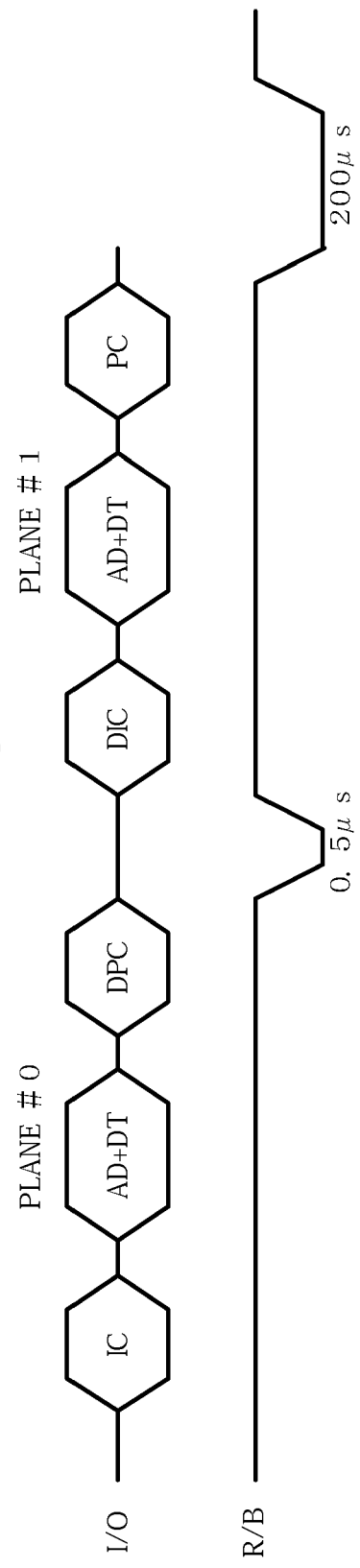

MEMORY CONTROLLER AND FLASH MEMORY SYSTEM

BACKGROUND OF THE INVENTION

1. Field of the Invention

The present invention relates to a memory controller and a flash memory system. The present invention particularly relates to a memory controller and a flash memory system which control access to a flash memory having a multi-plane write function like a two-plane write function, etc.

2. Description of the Related Art

Recently, there is active development on a flash memory which is a non-volatile storage medium. The flash memory is becoming popular as a storage medium for information devices (host systems) such as a digital camera. The amount of data such an information device handles becomes huge. Accordingly, the memory capacity of the flash memory becomes larger.

It is necessary to smoothly manage the memory area of a large-capacity flash memory. For this purpose, there is a scheme of dividing the memory area of a large-capacity flash memory into a plurality of zones and managing the zones as disclosed in, for example, Unexamined Japanese Patent Application KOKAI Publication No. 2005-18490.

Conventionally, the memory area of the flash memory having a plurality of zones is separated in the form shown in, for example, FIG. 7 for management.

A physical block includes a predetermined number of pages which are the physical units of data reading and writing. The physical block is a unit of data erasure. A unique Physical Block Address (PBA) is assigned to each physical block. Each physical block is classified into one of a plurality of physical zones. A unique Physical Zone Number (PZN) is assigned to each physical zone. For example, FIG. 7 shows 2048 physical blocks. Sequential PBAs, #0 to #2047, are assigned to the physical blocks. A total of 512 physical blocks with PBAs #0 to #511 belong to a physical zone with PZN #0. A total of 512 physical blocks with PBAs #512 to #1023 belong to a physical zone with PZN #1. A total of 512 physical blocks with PBAs #1024 to #1535 belong to a physical zone with PZN #2. A total of 512 physical blocks with PBAs #1536 to #2047 belong to a physical zone with PZN #3.

The host system manages the address space by a Logical Block Address (LBA). An LBA is a sequential number given to each area when the address space is separated into sector areas (each sector consisting of 512 bytes). A group of sector areas is called "logical block". A group of logical blocks is called "logical zone". A sequential number given to a logical block is called "Logical Block Number (LBN)". A sequential number given to a logical zone is called "Logical Zone Number (LZN)". A sequential number given to a logical block included in each logical zone is called "Logical Zone Internal Block Number (LZIBN)" in the logical zone.

Given that the number of logical blocks included in each logical zone is n, the quotient of dividing LBN by n corresponds to LZN, and the remainder corresponds to LZIBN.

One physical zone is assigned to each logical zone. Data corresponding to each logical block included in a logical zone is written in a physical block included in the physical zone that is assigned to the logical zone. A physical block has a redundant area in which information indicating the logical block corresponding to the written data in the physical block is written. Hereinafter, this information is called "logical address information".

In each physical block, data in the logical blocks allocated to that physical block are written in the order of LBAs. Therefore, the correlation between the LBA given from the host system and an access area in the flash memory can be managed by managing the correlation between physical blocks and logical blocks.

The correlation between physical blocks and logical blocks changes every time data writing or data erasure is executed. This makes it necessary to manage the correlation between both physical and logical blocks at each point of time. An address translation table is created to effect such management. The address translation table is updated every time the correlation between physical blocks and logical blocks changes. The correlation between logical zones and physical zones is preset. Therefore, the address translation table for each logical zone can be created by referring to the logical address information written in the redundant area in a physical block included in each physical zone.

LBN as well as LZIBN is used as logical address information. In general, LZIBN is written in the redundant area as logical address information because LZIBN has a smaller amount of data than LBN does.

The number of sector areas included in each logical block is set according to the number of sectors included in that physical block which is correlated with the logical block. Suppose that a flash memory in use is configured so that one physical block consists of 32 pages each corresponding to one sector area. In this case, if one logical block corresponds to one physical block, 32 sector areas are included in one logical block.

In the example of FIG. 7, the number of sector areas included in one logical block is 32. 16,000 sector areas with LBAs #0 to #15999 are allocated to the logical zone with LZN #0. 16,000 sector areas with LBAs #16000 to #31999 are allocated to the logical zone with LZN #1. 16,000 sector areas with LBAs #32000 to #47999 are allocated to the logical zone with LZN #2. 16,000 sector areas with LBAs #48000 to #63999 are allocated to the logical zone with LZN #3.

In the example of logical zones shown in FIG. 7, 16,000 sector areas are allocated to each logical zone. In each logical zone area, areas each consisting of 32 sectors are managed as logical blocks. The LBAs of the 32 sector areas belonging to each logical block are sequential. In other words, 32 sector areas with consecutive LBAs are one logical block. 500 (LZIBNs #0-#499) logical blocks with consecutive LBNs are allocated to each logical zone. The above configuration is just an example. The number of sector areas included in one logical blocks may be adequately set in such a way that the number of sector areas included in one logical block matches with the memory capacity of a plurality of physical blocks. Data is stored in the sequential order of LBAs in each page of a physical block. Therefore, an access destination in the flash memory is specified based on the correlation between logical blocks included in each logical zone and physical blocks included in that physical zone which is associated with the logical zone.

There is a two-plane flash memory having two planes as prior art. The prior art is described, for example, in Samsung's manual (Samsung Electronics, "K9XXG08UXM", [online], URL: http://www.samsung.com/Products/Semiconductor/NANDFlash/SLC_LargeBlock/16G bit/K9WAG08U1M/ds_k9xxg08uxm_rev10.pdf, retrieved from internet on 2006 Apr. 15.). This plane includes a memory cell array having a plurality of memory cells, and a register for accessing the memory cell array. In this two-plane flash memory, like an ordinary one-plane flash memory, the memory cell array is separated into physical blocks which are erasure units. Each physical block is separated into pages which are write or read units.

FIG. 8 shows an example of the two-plane flash memory. The two-plane flash memory includes a plane #0 and a plane #1. PBAs are alternately assigned to the physical blocks of the plane #0 and the plane #1. For example, the plane #0 has 2,048 physical blocks with PBAs #0, #2, #4 up to #4094. The plane #1 has 2,048 physical blocks with PBAs #1, #3, #5 up to #4095.

Each physical block in the two-plane flash memory includes 64 pages as shown in FIG. 9A. 64 page numbers #0 to #63 are assigned to each page.

As shown in FIG. 9B, each page includes a data area ("main field" in the flash memory disclosed in the aforementioned Samsung's manual) and a redundant area ("spare field" in the flash memory disclosed in the Samsung's manual). The data area stores data given from the host system. The data area has 4 sectors (512 bytes×4=2048 bytes). The redundant area is a 64-byte area for storing additional information. Additional information includes for example an Error Correcting Code corresponding to data in the data area.

A register #0 and a register #1 as shown in FIG. 8 are memory areas for temporarily holding data. The "data" here is data to be written in the data area (2048 bytes) and the redundant area (64 bytes) of each page, or data read from the data area (2048 bytes) and the redundant area (64 bytes).

In the two-plane flash memory, data held in the register #0 and register #1 shown in FIG. 8 can be written in the flash memory in a write system called two-plane write. In the two-plane write, data is written in pages of a preset pair of physical blocks (a physical block in the plane #0 and a physical block in the plane #1). In other words, these two physical blocks are associated with each other.

When one logical block is allocated to one pair of physical blocks, 512 sector areas (sector numbers #0-#511) included in the logical block are allocated in the pages of the pair of physical blocks in the order shown in FIG. 10. That is, the area with sector numbers #0-#3 are allocated to the page number #0 in the plane #0, sector numbers #4-#7 are allocated to the page number #0 in the plane #1, sector numbers #8-#11 are allocated to the page number #1 in the plane #0, sector numbers #12-#15 are allocated to the page number #1 in the plane #1, and so forth. Sector numbers #504-#507 are allocated to the page number #63 in the plane #0, and sector numbers #508-#511 are allocated to the page number #63 in the plane #1.

A plane-by-plane write timing chart and a timing chart for two-plane write (two-plane page program in the flash memory disclosed in the aforementioned Samsung's manual) will be described below. The normal writing is carried out as shown in a timing chart in FIG. 11A. An input command "IC" instructing data writing to the register, a write destination address "AD" and write data "DT", and a write command "PC" instructing writing to the memory cell array from the register are supplied to the plane #0 or the plane #1 in the flash memory in order. In the flash memory disclosed in the Samsung's manual, a busy time of 200 μsec occurs after the supply of the write command "PC". The data written in the register is written in the memory cell array during the busy time.

The timing chart for two-plane write is shown in FIG. 11B. First, an input command "IC", a write destination address "AD" and write data "DT", and a dummy write command "DPC" are supplied to the plane #0. Then, a dummy input command "DIC", the write destination address "AD" and write data "DT", and a write command "PC" are supplied to the plane #1. In the two-plane write, a dummy busy time of 0.5 μsec occurs after the supply of the dummy write command "DPC". The data written in the register of the plane #0 and the register of the plane #1 are simultaneously written in the flash memory after the write command "PC" is supplied thereto. The busy time that occurs at the time of the writing is 200 μsec which is the same as the busy time which occurs at the time of data writing to one plane, either the plane #0 or the plane #1. That is, in two-plane write, the amount of data to be written in the flash memory is equivalent to the amount of data in two registers. However, the busy time that occurs in the writing process is approximately the same (0.5 μ+200 μ=200.5 μ) as the busy time (200 μsec) that occurs in the normal writing, i.e., in data writing in one register. The two-plane write therefore achieves fast data writing.

However, the two-plane write is executed with respect only to an associated free physical blocks i.e. a preset pair of physical blocks. When one of the pair of physical blocks becomes a defective block, therefore, only normal writing is performed to the other physical block. When fast writing is desired, therefore, it is necessary to use a pair of physical blocks to which two-plane write is enabled by priority. There may be a case where the number of pairs of physical blocks each having good (non-defected) blocks becomes smaller so that no further pairs of physical blocks to which two-plane write is enabled can be secured as far as the preset condition is concerned. In this case, a memory area cannot be secured unless a good block in a pair of physical blocks one of which has become a defective block is used.

SUMMARY OF THE INVENTION

The present invention has been made in consideration of the above-described problem. It is therefore an object of the present invention to provide a memory controller and a flash memory system which can efficiently use a multi-plane write function of a flash memory having such a multi-plane write function.

To achieve the object, according to the first aspect of the invention, there is provided a memory controller that accesses a flash memory having multi planes each of which has physical blocks, a multi-plane write function for writing data into associated physical blocks of the multi planes simultaneously, and a plane-by-plane write function for writing data into a physical block, comprising:

first search means for detecting the associated physical blocks all of which are free physical blocks and non of which is in a defect state;

second search means for detecting physical blocks each of which is a free physical block and belongs to the associated physical blocks including at least one physical block being in the defect state; and write means for performing both plane-by-plane write in which the write means writes data into a physical block and multi-plane write in which the write means writes data into the associated physical blocks of multi planes simultaneously, wherein when the associated physical blocks are detected by the first search means, the write means performs the multi-plane write to the detected associated physical blocks, and when the associated physical blocks are not detected by the first search means, the write means performs the plane-by-plane write to the physical blocks detected by the second search means.

It is preferable that the first search means has a table indicating a free state of a set of multi-plane writable physical blocks by a logical value of bits associated with the set of multi-plane writable physical blocks.

The use of the table can ensure efficient search for only a set of free physical blocks.

The multi planes, for example, consist of two planes.

The second search means may detect free physical blocks to which multi-plane write is disabled but plane-by-plane write is enabled.

The memory controller may further comprise a discrimination means for discriminating which one of a set of associated physical blocks is subjectable to plane-by-plane write when the set of the associated physical blocks to which multi-plane write is disabled occurs, wherein the second search means has a non-set good block table having a list of physical block addresses of free physical blocks to which multi-plane write is disabled but plane-by-plane write is enabled, and when a set of physical blocks to which multi-plane write is disabled occurs, the discrimination means writes a physical block address of any physical block which is discriminated as being subjectable to plane-by-plane write into the non-set good block table.

A flash memory system according to the second aspect of the invention comprises:

the memory controller; and a flash memory having a multi-plane write function.

To achieve the object, according to the third aspect of the invention, there is provided a memory controller that accesses a flash memory having multi planes each of which has physical blocks, a multi-plane write function for writing data into associated physical blocks of the multi planes simultaneously, and a plane-by-plane write function for writing data into a physical block, comprising:

a first searcher which detects the associated physical blocks all of which are free physical blocks and non of which is in a defect state;

a second searcher which detects physical blocks each of which is a free block and belongs to the associated physical block including at least one physical block being in the defect state; and a writer which performs both plane-by-plane write in which the writer writes data into a physical block and multi-plane write in which the writer writes data into the associated physical blocks of multi planes simultaneously, wherein when the associated physical blocks are detected by the first searcher, the writer performs the multi-plane write to the detected associated physical blocks, and when the associated physical blocks are not detected by the first searcher, the writer performs the plane-by-plane write to the physical blocks detected by the second searcher.

BRIEF DESCRIPTION OF THE DRAWINGS

These objects and other objects and advantages of the present invention will become more apparent upon reading of the following detailed description and the accompanying drawings in which:

FIG. 5 is a diagram showing one example of the structure of a free physical block search table;

FIG. 6 is a diagram showing one example of the structure of a non-pair good block table;

FIG. 10 is a diagram schematically showing the correlation between a memory area in a physical block of two-plane flash memory and sector areas included in a logical block;

FIG. 11A is a diagram illustrating a timing chart when conventional writing is executed to a flash memory; and FIG. 11B is a diagram illustrating a timing chart when two-plane write is executed to a two-plane flash memory.

DETAILED DESCRIPTION OF THE PREFERRED EMBODIMENT

A preferred embodiment of the present invention will now be described with reference to the accompanying drawings.

Figure 1:
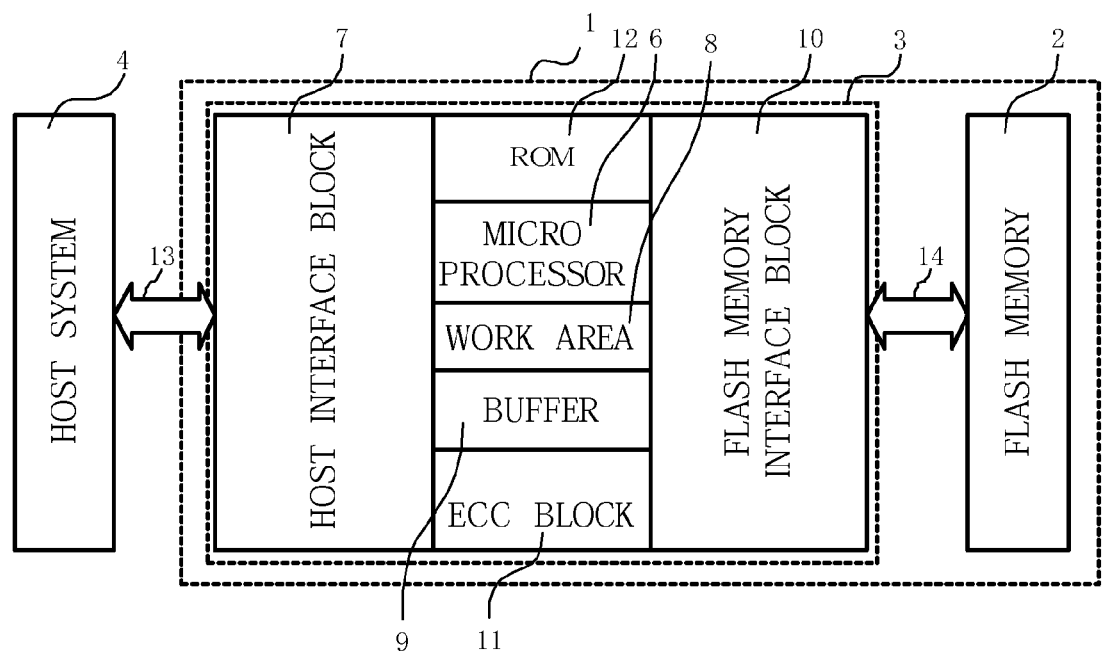
FIG. 1 is a block diagram schematically showing a flash memory system according to one embodiment of the invention.

As shown in FIG. 1, the flash memory system 1 according to the embodiment includes a flash memory 2 (two-plane flash memory) and a controller 3 which controls the flash memory 2.

The flash memory system 1 is connected to a host system 4 by an external bus 13. The host system 4 includes a central processing unit (CPU) which controls the general operation of the host system 4, and a companion chip which exchanges information with the flash memory system 1. The host system 4 is, for example, a personal computer which processes various kinds of information, such as texts, speeches and image information. The host system 4 may be any of various information processing apparatuses including a digital still camera.

The flash memory 2 is a non-volatile memory. The flash memory 2 has a register and a memory cell array. In writing or reading data into or from the flash memory 2, data from the register is written into the memory cell array, or data is read from the memory cell array into the register.

The memory cell array has a plurality of memory cell groups and word lines. Each memory cell group has a plurality of memory cells connected in series. A word line serves to select a specific memory cell in each memory cell group. Data writing or reading is performed between the memory cell selected by the word line and the register. That is, data is written into the selected memory cell from the register, or is read into the register from the selected memory cell.

Each of the memory cells constituting the memory cell array is comprised of an MOS transistor which has two gates. The upper gate in the two gates is called "control gate", and the lower gate is called "floating gate". As charges (electrons) are injected into the floating gate or charges (electrons) are drawn from the floating gate, data writing or data erasure is executed.

The floating gate is surrounded by an insulator, so that the electrons injected into the floating gate are held for a long period of time. In injecting electrons into the floating gate, a high voltage is applied between the control gate and the floating gate while setting the control gate to a high-potential side. In drawing electrons from the floating gate, on the other hand, a high voltage is applied between the control gate and the floating gate while setting the control gate to a low-potential side.

The state where electrons are injected into the floating gate is a write state. The write state corresponds to a logic value of "0". The state where electrons are drawn from the floating gate is an erasure state. The erasure state corresponds to a logic value of "1".

Figure 2:
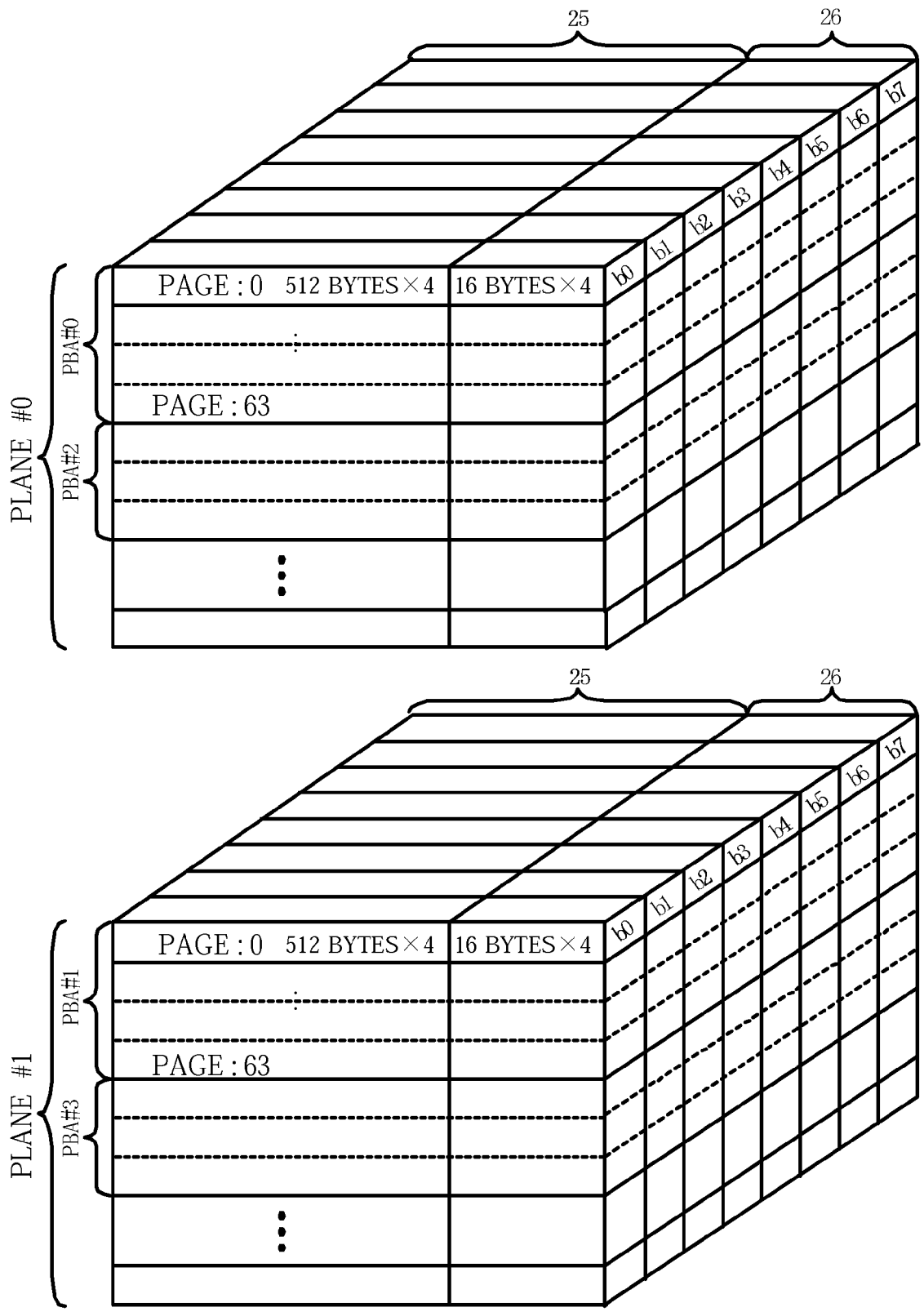
FIG. 2 is a diagram schematically showing the structure of the address space of a two-plane flash memory according to the embodiment of the invention.

The physical address space of the flash memory 2 having two planes (plane #0 and plane #1) is shown in FIG. 2. The physical address space of the flash memory 2 (two-plane flash memory) includes "pages", "blocks (physical blocks)", and "planes".

The "page" is a process unit in a data reading operation and a data writing operation which are executed in an ordinary flash memory. The "physical block" is a process unit in a data erasing operation which is executed in the flash memory. Each physical block includes a plurality of pages.

In the flash memory 2 (two-plane flash memory) shown in FIG. 2, one page has a data area 25 of 4 sectors (512×4 bytes) and a redundant area 26 of 64 bytes (16×4 bytes). One physical block has 64 pages.

PBAs are alternately assigned to physical blocks in the plane #0 and the plane #1. For example, even PBAs #0, #2, #4 and so forth are assigned to the physical blocks in the plane #0 in order. Odd PBAs #1, #3, #5 and so forth are assigned to the physical blocks in the plane #1 in order.

The data area 25 serves to store user data supplied from the host system 4. The redundant area 26 serves to store additional data, such as an Error Correcting Code (ECC), logical address information and a block status (flag).

The ECC is data which is used to detect an error contained in data stored in the data area 25 and to correct the error.

The logical address information specifies a logical block corresponding to data when the data is stored in a physical block.

Logical address information is not written in an erased physical block. Therefore, it is possible to determine whether or not valid data is stored in a physical block including the redundant area 26 by checking if the logical address information is stored in the redundant area 26. That is, if logical address information is not stored in the redundant area 26 included in a physical block, it can be determined that valid data is not stored in that physical block.

As mentioned above, one physical block includes a plurality of pages. Data can not be overwritten in those pages. Even when only data stored in one page is rewritten, therefore, data stored in the entire pages in the physical block in which the target page is included should be written again.

That is, in the normal data rewriting, data stored in the entire pages in the physical block in which a page to be rewritten is included is written in another data-erased physical block. At this time, data stored in those pages whose data is not to be changed is written in the another physical block in the same manner as has been stored in the original physical block.

In rewriting data in the above manner, rewritten data is normally written in a physical block different from the physical block where the data has been written previously. Therefore, the correlation between a logical block (logical block number) and a physical block (physical block address) dynamically changes every time data is rewritten in the flash memory 2.

This makes it necessary to manage the correlation between logical blocks and physical blocks. This correlation is normally managed by an address translation table. The address translation table is created based on the logical address information (LZIBN or LBN) stored in the redundant area 26 of each physical block. As mentioned above, this dynamic address management scheme is generally performed in a flash memory system using a flash memory.

The block status (flag) is a flag indicating whether a block is good or defective. A block where data writing or the like is not performed properly is discriminated as a defective block. A block status (flag) indicating a defective block is written in the redundant area 26 in the defective block.

The flash memory 2 receives data, address information, an internal command, etc. from the controller 3. Then, the flash memory 2 performs various processes, such as a data reading process, a data writing process, a block erasing process and a transfer process.

With the internal command, the controller 3 instructs the flash memory 2 to execute various processes. The flash memory 2 operates according to the internal command supplied from the controller 3. An external command allows the host system 4 to instruct the flash memory system 1 to execute various processes.

As shown in FIG. 1, the controller 3 includes a microprocessor 6, a host interface block 7, a work area 8, a buffer 9, a flash memory interface block 10, an ECC block 11, and Read Only Memory (ROM) 12. The controller 3 constituted by those functional blocks is integrated on a single semiconductor chip. The functional blocks will be described below.

The microprocessor 6 controls the general operation of the controller 3 according to a program stored in the ROM 12. For example, the microprocessor 6 reads a set of commands defining various processes or the like from the ROM 12. Subsequently, the microprocessor 6 supplies the command set to the flash memory interface block 10. The flash memory interface block 10 executes the processes corresponding to the supplied command set.

The host interface block 7 exchanges data, address information, status information, an external command, etc. with the host system 4. Data or the like supplied to the flash memory system 1 from the host system 4 is fetched into, for example, the buffer 9 in the flash memory system 1. At this time, the host interface block 7 functions as an entry for the data. At the time data or the like to be supplied to the host system 4 from the flash memory system 1 is supplied to the host system 4, the host interface block 7 serves as an exit for the data or the like.

Data necessary to control the flash memory 2 is temporarily stored in the work area 8 shown in FIG. 1. The work area 8 is constituted by a plurality of Static Random Access Memory (SRAM) cells.

The buffer 9 temporarily stores data read from the flash memory 2 and data to be written in the flash memory 2. That is, data read from the flash memory 2 is held in the buffer 9 until the host system 4 becomes ready to receive the data. Likewise, data to be written in the flash memory 2 is held in the buffer 9 until the flash memory 2 becomes a writable state.

The flash memory interface block 10 exchanges data, address information, status information, an internal command, etc. with the flash memory 2 via an internal bus 14.

The flash memory interface block 10 supplies the internal command, address information, etc. to the flash memory 2 based on a command set read from the ROM 12. Based on the supplied internal command, address information, etc., the flash memory 2 executes data reading, data writing or the like.

The ECC block 11 generates an ECC to be added to data to be written in the flash memory 2. Based on the ECC added to data read from the flash memory 2, the ECC block 11 detects an error contained in the read data and corrects the detected error.

The ROM 12 is a non-volatile memory device. The ROM 12 stores a program which defines procedures of a process which is executed by the microprocessor 6. Specifically, the ROM 12 stores a program which defines procedures of a process, such as creation of the address translation table.

In the embodiment, the address translation table is created on the work area 8. The address translation table stores the correlation between logical zone internal block numbers (LZIBNs) and physical zone internal block numbers (PZIBNs). A logical block having the LZIBN and a physical block having the PZIBN are respectively included in a logical zone and a physical zone which are associated with each other. PZIBNs are assigned to a plurality of physical blocks in a physical zone in order from an younger PBA to an older one.

In the embodiment, a physical zone has 1,024 physical blocks with PZIBNs #0 to #1023. Each of physical blocks with even PZIBNs (physical blocks in the plane #0) makes a pair with an associated one of physical blocks with odd PZIBNs (physical blocks in the plane #1) in order from an younger PZIBN to an older one. When data is written in the this pair of physical blocks, two-plane write is enabled. This pair of physical blocks is hereinafter called "pair block". When one block in a pair block is a defective block, the other one good block is called "non-pair good block". In the embodiment, two physical blocks are allocated to one logical block. That is, one pair block or two non-pair good blocks adequately combined are allocated to one logical block. Two adequately combined non-pair good blocks will be called "dummy pair" hereinafter.

Figure 3:
FIG. 3 is a diagram showing one example of the structure of an address translation table.
Figure 4:
FIG. 4 is a diagram showing one example of the structure of a dummy pair table.
Figure 7:
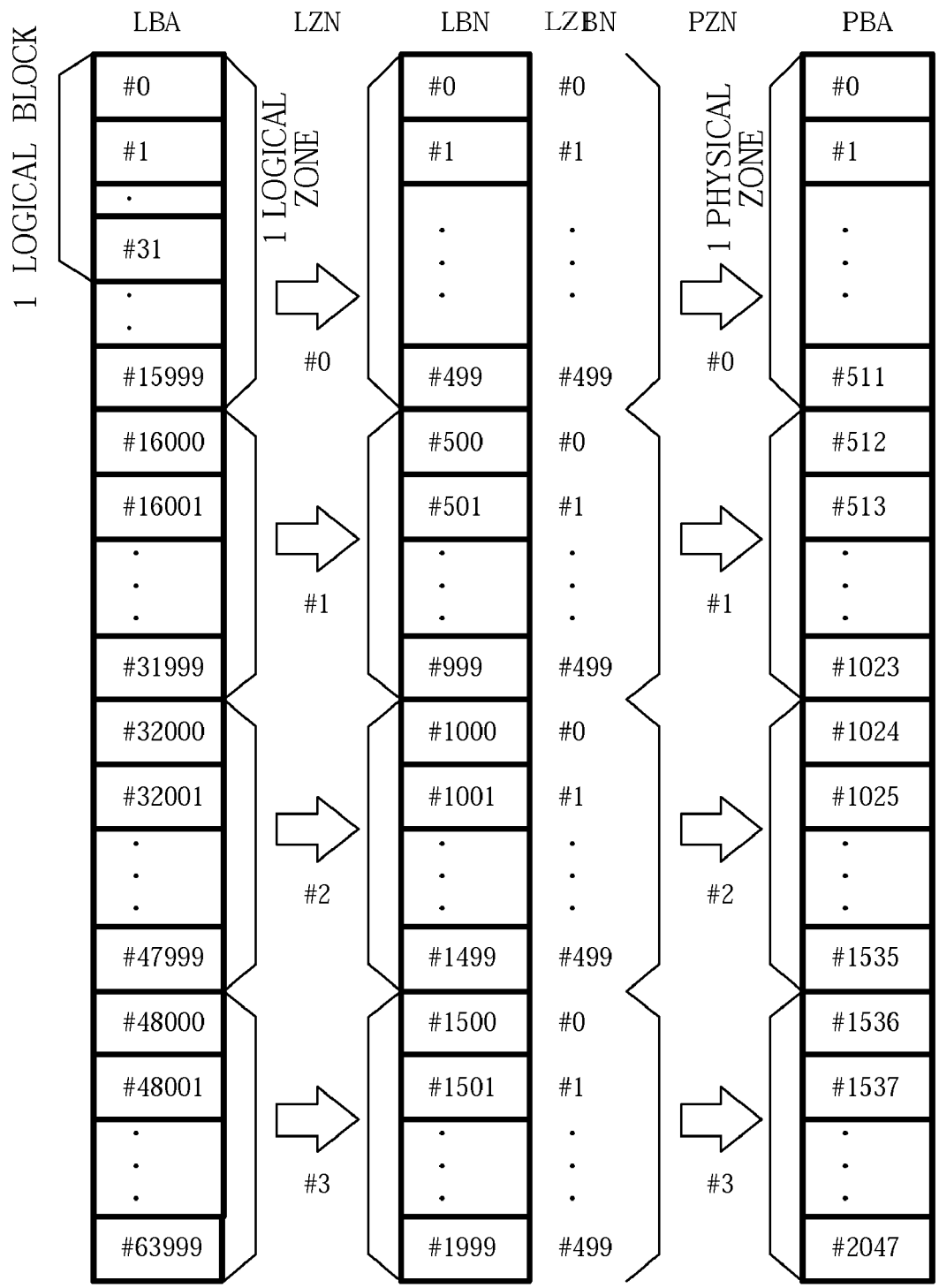
FIG. 7 is a diagram schematically showing the structure of the address space of a conventional flash memory.
Figure 8:
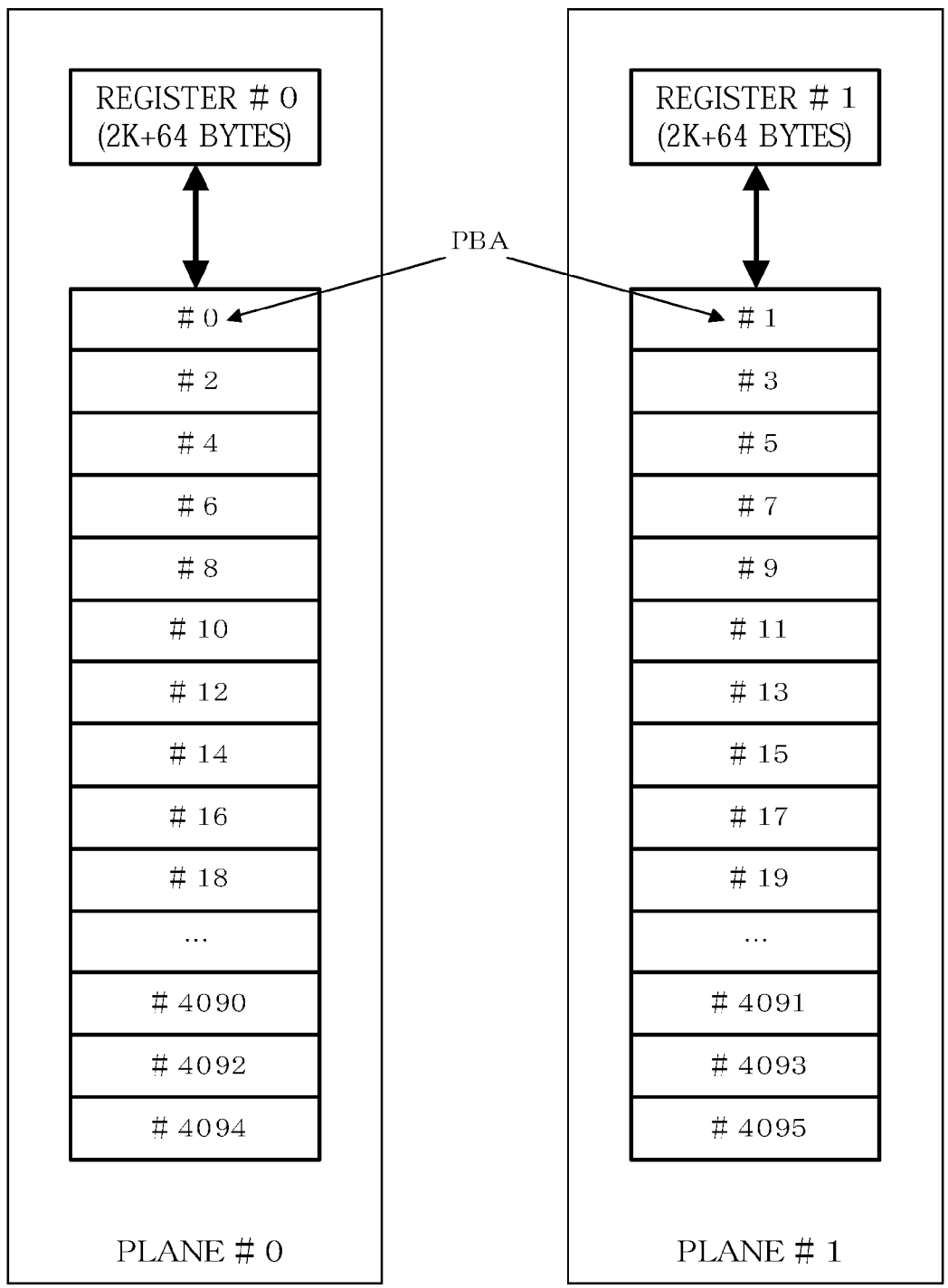
FIG. 8 is a diagram schematically showing the structure of the physical address space of a two-plane flash memory.
Figure 9A:
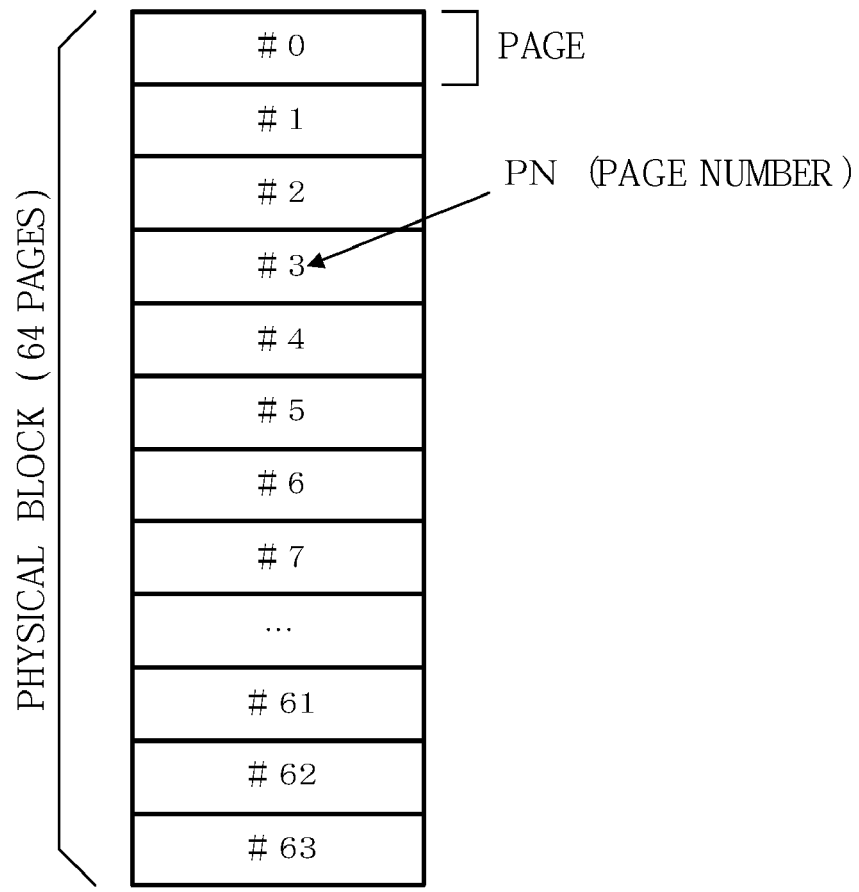
FIG. 9A is a diagram schematically showing the relationship between a physical block and pages in the two-plane flash memory.
Figure 9B:
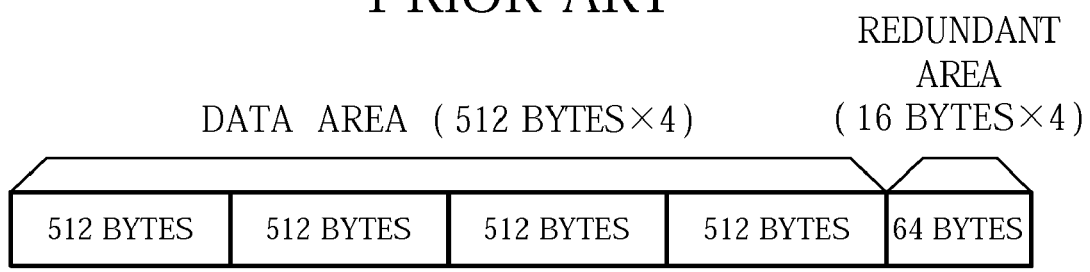
FIG. 9B is a diagram schematically showing the relationship among a page, a data area and a redundant area in the two-plane flash memory.

The address translation table will now be explained referring to FIGS. 3 and 4. A address translation table 400 shown in FIG. 3 is an example of the aforementioned address translation table. The address translation table 400 is created for each set of a logical zone and a physical zone associated with each other, and is saved in the work area 8. The PZIBN of the plane-#0 side physical block in a pair block corresponding to each of the logical blocks with LZIBNs #0-#499 or the PZIBN of the one of physical blocks in a dummy pair corresponding to each of those logical blocks is written in the address translation table 400. Whether two physical blocks corresponding to each of the logical blocks with LZIBNs #0-#499 are a pair block or a dummy pair is indicated by a pair flag. In the example shown in FIG. 3, the pair flag of "0" indicates that the correlated two physical blocks are a pair block, and the pair flag of "1" indicates that the correlated two physical blocks are a dummy pair.

In the example shown in FIG. 3, a pair block comprised of the physical block with PZIBN #22 in the plane #0 and the physical block with PZIBN #23 in the plane #1 is allocated to the logical block with LZIBN #0. Likewise, a pair block comprised of the physical block with PZIBN #12 in the plane #0 and the physical block with PZIBN #13 in the plane #1 is allocated to the logical block with LZIBN #1. Likewise, a pair block comprised of the physical block with PZIBN #6 in the plane #0 and the physical block with PZIBN #7 in the plane #1 is allocated to the logical block with LZIBN #2. When the pair flag is "0", the correlated two physical blocks are a pair block. When the pair flag is "0", therefore, based on a PZIBN on the plane #0 side, it is possible to determine the PZIBN of the other physical block which is paired with the physical block having the PZIBN on the plane #0 side in the pair block.

When a logical block is assigned to a dummy pair, like the logical block with LZIBN #4 (when the pair flag is "1"), on the other hand, only the PZIBN of one (non-pair good block) of the physical blocks in the dummy pair is determined from the address translation table 400. That is, it is determined that one physical block in the dummy pair allocated to the logical block with LZIBN #4 is the physical block (non-pair good block) with PZIBN #8. However, the PZIBN of the other physical block (non-pair good block) cannot be determined from the address translation table 400 alone. In this respect, a dummy pair table indicating the combination of a dummy pair is prepared and saved in the work area 8 separately from the address translation table 400. The PZIBN of the other physical block (non-pair good block) is determined by referring to the dummy pair table. The PZIBNs of two physical blocks (non-pair good blocks) constituting a dummy pair are written side by side in a dummy pair table 300 shown in FIG. 4. Referring to the dummy pair table 300, it is determined that the physical block (non-pair good block) with PZIBN #15 is combined with the physical block (non-pair good block) with PZIBN #8.

Next, a table for searching for a free physical block will be explained. A free physical block search table 100 shown in FIG. 5 represents the use states of pair blocks in a physical zone in the flash memory 2. The free physical block search table 100 is created for each physical zone, is saved in the work area 8, and is managed by the microprocessor 6.

The free physical block search table 100 consists of 64-byte (512-bit) data. The free physical block search table 100 represents the use state of a pair block by the logical value of each bit. In the free physical block search table 100, a free physical block is indicated by the logical value of "1" and non-free physical block is indicated by the logical value of "0". That is, the logical value of "1" indicates that both blocks in a pair block corresponding to the bit are good blocks and are in a state where data is not written (erasure state). On the other hand, the logical value of "0" indicates a state where data is written in the a pair block corresponding to the bit, or indicates that both blocks or one block in the pair block is a defective block.

FIG. 5 shows data of 64 bytes indicating the use states of 512 sets of pair blocks, row by row for each byte. The topmost row shows the use states of pair blocks such that the physical blocks in the plane #0 have PZIBNs #0-#14 (pair blocks with PZIBNs #0 and #1, PZIBNs #2 and #3, PZIBNs #4 and #5, PZIBNs #6 and #7, PZIBNs #8 and #9, PZIBNs #10 and #11, PZIBNs #12 and #13, and PZIBNs #14 and #15). Likewise, the second row shows the use states of pair blocks such that the physical blocks in the plane #0 have PZIBNs #16-#30, and the third row shows the use states of pair blocks such that the physical blocks in the plane #0 have PZIBNs #32-#46. The lowermost row shows the use states of pair blocks such that the physical blocks in the plane #0 have PZIBNs #1008-#1022. Pair blocks are assigned to 1-byte data of each row in the ascending order of PZIBNs from the lower bit side. Therefore, the least significant bit in the topmost row shows the use state of a pair block with PZIBNs #0 and #1, and the most significant bit in the lowermost row shows the use state of a pair block with PZIBNs #1022 and #1023.

At the time of searching for a free physical block, first, the micro processor 6 reads out 1-byte data of the individual rows in the free physical block search table 100 in order from in the top row. When the read data is not 0 (binary decimal notation: 0000 0000), the micro processor 6 writes the data in the shift register (not shown). Then, the data written in the shift register is shifted in the direction of lower bits. Then, in which shift a carry has occurred is counted. Based on the count result, it is discriminated which bit from the least significant bit is "1". For example, when 0001 1000 (binary decimal notation) of the fourth row is written in the shift register and then shifted in the shift register in the direction of lower bits, a carry occurs in four shifts. In this manner, a pair block comprised of the physical block with PZIBN #54 and the physical block with PZIBN #55 corresponding to the fourth bit from the least significant bit is detected as free physical blocks.

In the next search for free physical blocks, the search starts from the fifth bit from the least significant bit of the fourth row. In starting the search from the fifth bit from the least significant bit, a mask process is performed before setting data in the shift register in such a way that lower 4 bits of the data to be set become "0".

Figure 6:
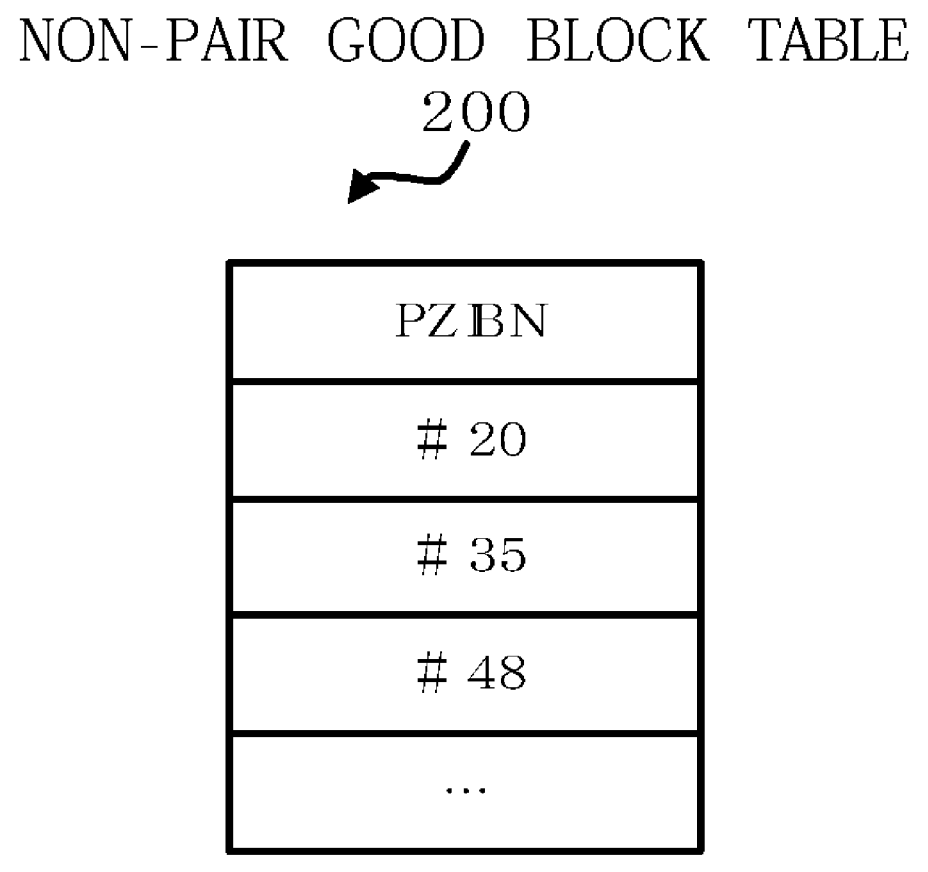

Next, a table for searching for a free physical block in non-pair good blocks will be described. Saved in a non-pair good block table 200 shown in FIG. 6 is the PZIBN of a good block (non-pair good block) in two physical blocks constituting a pair block one of whose blocks becomes a defective block. In the example shown in FIG. 6, #20, #35 and #48 are written in the rows of the non-pair good block table 200. This indicates that three physical blocks with PZIBNs #20, #35 and #48 are non-pair good blocks. It is therefore apparent that the physical blocks with PZIBNs #21, #36 and #49, which are respectively supposed to constitute pair blocks originally with the physical blocks with above PZIBNs #20, #35 and #48, are defective blocks.

When data is written in a pair block detected using the free physical block search table 100, the bit corresponding to the pair block is rewritten from "1" to "0" in the free physical block search table 100. In the address translation table 400, the PZIBN that is correlated with the LZIBN of the logical block corresponding to the written data is rewritten with the PZIBN of the plane-#0 side physical block in the pair block where writing is to be done. The LZIBN of the logical block corresponding to the written data is written in the redundant areas 26 of both physical blocks in the data-written pair block.

When data is written in the two non-pair good blocks detected by referring to the non-pair good block table 200, the PZIBNs of the data-written two non-pair good blocks are erased from the non-pair good block table 200. In the address translation table 400, the PZIBN correlated with the LZIBN of the logical block corresponding to the written data is rewritten with a younger one of the PZIBNs of the two non-pair good blocks where data is written. Further, the PZIBNs of the data-written two non-pair good blocks are written in the dummy pair table 300 in the younger-to-older PZIBN order. In the embodiment, when data is written in a dummy pair, data is written in the physical blocks in order from a physical block assigned with a younger PZIBN. The LZIBN of the logical block corresponding to the written data is written in the redundant areas 26 of both non-pair good blocks in the data-written dummy pair.

A description will now be given of the process performed by the microprocessor 6 of creating the address translation table 400, the dummy pair table 300, the free physical block search table 100 and the non-pair good block table 200. The areas where those tables are created are secured on the work area 8. The initial value of that portion of each of the tables-created areas where the PZIBN is to be written is set to a value from which it can be discriminated that a PZIBN is not written.

In the table creating process, a block status (flag) and LZIBN (logical address information) written in the redundant area 26 of a physical block included in a physical zone for which the tables are to be created are sequentially read out, and the following process is executed according to the read information.

When the same LZIBN is written in both physical blocks constituting a pair block, the pair flag of that portion in the address translation table 400 (area for creating the address translation table 400) which corresponds to the LZIBN is set to "0". In addition, the PZIBN of the plane-#0 side physical block in that pair block is written in the address translation table 400 as the PZIBN of the correlated block in the pair block.

When the LZIBN is written only in one of the physical blocks of a pair block and the block status (flag) indicating a defective block is written in the other physical block, the pair flag of that portion in the address translation table 400 which corresponds to the LZIBN written in the former physical block is set to "1". In addition, the PZIBN of the physical block is written as the PZIBN of the correlated dummy pair. When the other physical block in the dummy pair is detected thereafter, the PZIBNs of the two physical blocks (non-pair good blocks) constituting the dummy pair are written in the dummy pair table 300 (area for creating the dummy pair table 300). Because the same LZIBN is written in the redundant areas 26 of the two physical blocks (non-pair good blocks) constituting the dummy pair, the micro processor 6 can discriminate the block combination of the dummy pair by checking whether the LZIBN written in the redundant areas 26 agrees with each other.

When neither an LZIBN nor a block status (flag) indicating a defective block is written in both physical blocks constituting a pair block, "1" is set to that bit in the free physical block search table 100 (area for creating the free physical block search table 100) which corresponds to the pair block. All the bits in the free physical block search table 100 (area for creating the free physical block search table 100) are initialized to "0" at the time of starting creating the free physical block search table 100.

When an LZIBN is not written in both physical blocks constituting a pair block and a block status (flag) indicating a defective block is written in one of the physical blocks of the pair block, the PZIBN of the other physical block where the block status (flag) indicating a defective block is written in the non-pair good block table 200 (area for creating the non-pair good block table 200).

By executing the above-described process for every physical block included in the physical zone for which the tables are to be created, the microprocessor 6 creates the address translation table 400, the dummy pair table 300, the free physical block search table 100 and the non-pair good block table 200.

Next, writing of data in a free physical block in the flash memory 2 by the host system 4 via controller 3 will be described. The host system 4 gives write instruction information to the controller 3. This write instruction information includes a command instructing writing (external command), information indicating an LBA at which writing will start, and information indicating the number of sectors where data is to be written. Based on the LBA and the number of sectors, a logical zone (LZN) and a logical block (LZIBN) where writing is to be done is specified. When data cannot be written in the a free page of the physical block (PZIBN) corresponding to the logical block (LZIBN), i.e., when existing data is to be rewritten, or there is no physical block corresponding to the logical block, a free physical block is searched for, and data is written in the detected free physical block.

In searching for a free physical block, the microprocessor 6 executes a search for a free physical block using the free physical block search table 100. When a pair block whose both physical blocks are free is detected in this search, two-plane write is performed on the pair block. When the free physical block search table 100 does not have any bit with the logical value of "1", i.e., when there is no free pair block, the PZIBNs of two physical blocks (non-pair good blocks) are selected from the non-pair good block table 200. Then, plane-by-plane write is performed with two non-pair good blocks corresponding to the selected two PZIBNs taken as a dummy pair. The micro processor 6 writes in the dummy pair table 300 PZIBNs of the physical blocks of this dummy pair.

That is, first, a free pair block is searched for using the free physical block search table 100. Only when a free pair block is not detected in the search using the free physical block search table 100, i.e., only when there is no free pair block, normal writing is performed on a dummy pair which is specified by the two PZIBNs selected from the non-pair good block table 200.

When there is a free pair block, therefore, two-plane write is performed on the pair block. Only when there is no free pair block, plane-by-plane normal writing is performed on the dummy pair.

As described above, the controller 3 according to the embodiment of the invention searches for a free physical block where data is to be written in the flash memory system 1 using the flash memory 2 having the two-plane write function. At this time, the controller 3 first executes a search process using the free physical block search table 100 to search only for a free pair block. Only when a free pair block cannot be detected in the search process using the free physical block search table 100, the controller 3 searches for free non-pair good blocks. With this configuration, when a free pair block present, two-plane write is performed by priority. Even when free pair blocks where two-plane write is enabled can no longer be secured due to an increased number of non-pair good blocks, data can be written in adequately combined non-pair good blocks.

According to the invention, a free physical block where data is to be written is searched for as follows. First, the search is executed using a search table for searching only for a pair of free physical blocks. Then, only when a pair of free physical blocks is not detected in the search, free non-pair good blocks are searched for. The "non-pair good block" indicates a good block in a pair of physical blocks one of which is defective. With free physical blocks searched this way, when there is a pair of free physical blocks, two-plane write is executed. When there is no pair of free physical blocks, plane-by-plane normal writing is executed on adequately combined free physical blocks. Accordingly, the two-plane write function can be used efficiently.

The invention is not limited to the above-described embodiment, and can be modified and applied in various other forms.

The number of physical blocks in each physical zone is not limited to 1024, and may be set freely.

Although the number of planes in the embodiment is two, the number of planes is not limited to two and may be set to any number, such as three, four and so on. The address translation table 400 can be used for any types of a multi-plane system (ten-plane system for example) with slight modification, replacing a pair flag with a set flag. In this case, ten physical blocks of ten planes are usually associated with each other to form a set consisting of ten physical blocks. The set flag is "0" when the set of physical blocks are all free and has no defected physical block and is "1" when the set includes at least one defected physical block. The dummy pair table 300 is replaced with a dummy set table which stores a plurality of sets of physical address of physical blocks constituting a dummy set. The dummy set includes ten physical blocks which stores data whose logical block address is the same with each other. The dummy set table stores sets of ten physical block address of physical blocks. The non-pair good block table 200 is replaced with a non-set good block table. This table stores physical addresses of the good and free physical blocks which belong to sets each of which includes at least one defected physical block. This table may store the physical addresses at random, or in the unit of physical addresses of physical blocks belonging to the same set. When writing data, the micro process 6, first, searches set of physical blocks all of which are free and have no defected one with using the free physical block search table. If succeed, it writes data to the searched physical blocks. If it can not search the set, it searches free blocks with using the non-set good block table. In this case, the micro processor 6 may search the free good blocks in unit of block, or in unit of free physical blocks belonging to one set, for example. The micro process 6 forms a dummy set by searched ten free physical blocks.

In the embodiment, a dummy pair is comprised of a physical block belonging to the plane #0 and a physical block belonging to the plane #1. However, a dummy pair may be comprised of two physical blocks both belonging to the plane #0, or may be comprised of two physical blocks both belonging to the plane #1. In this case, for example, write data may be allocated on the condition that a physical block with a younger PZIBN in the physical blocks constituting a dummy pair is treated as belonging to the plane #0 while the other physical block is treated as belonging to the plane #1.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-113395 filed on Apr. 17, 2006 and including specification, claims, drawings and summary. The disclosure of the above Japanese Patent Application is incorporated herein by reference in its entirety.

What is claimed is:

1. A memory controller that accesses a flash memory having multi planes each of which has physical blocks, a multi-plane write function for writing data into associated physical blocks of the multi planes simultaneously, and a plane-by-plane write function for writing data into a physical block, comprising:

first search means for detecting the associated physical blocks all of which are free physical blocks and non of which is in a defect state;

second search means for detecting physical blocks each of which is a free physical block and belongs to the associated physical blocks including at least one physical block being in the defect state;

write means for performing both plane-by-plane write in which the write means writes data into a physical block and multi-plane write in which the write means writes data into the associated physical blocks of multi planes simultaneously; and discrimination means for discriminating which one of a set of associated physical blocks is subjectable to the plane-by-plane write when the set of the associated physical blocks to which the multi-plane write is disabled occurs, wherein when the associated physical blocks are detected by the first search means, the write means performs the multi-plane write to the detected associated physical blocks, when the associated physical blocks are not detected by the first search means, the write means performs the plane-by-plane write to the physical blocks detected by the second search means, the second search means has a non-set good block table having a list of physical block addresses of free physical blocks to which the multi-plane write is disabled but the plane-by-plane write is enabled, and when a set of physical blocks to which the multi-plane write is disabled occurs, the discrimination means writes a physical block address of any physical block which is discriminated as being subjectable to the plane-by-plane write into the non-set good block table.

2. The memory controller according to claim 1, wherein the first search means has a table indicating a free state of a set of multi-plane writable physical blocks by a logical value of bits associated with the set of multi-plane writable physical blocks.

3. The memory controller according to claim 1, wherein the multi planes consists of two planes.

4. The memory controller according to claim 1, wherein the second search means detects free physical blocks to which multi-plane write is disabled but plane-by-plane write is enabled.

5. A flash memory system comprising:
a memory controller recited in claim 1; and
a flash memory having a multi-plane write function.

6. A memory controller that accesses a flash memory having multi planes each of which has physical blocks, a multi-plane write function for writing data into associated physical blocks of the multi planes simultaneously, and a plane-by-plane write function for writing data into a physical block, comprising:

a first searcher which detects the associated physical blocks all of which are free physical blocks and non of which is in a defect state;

a second searcher which detects physical blocks each of which is a free block and belongs to the associated physical block including at least one physical block being in the defect state; a writer which performs both plane-by-plane write in which the writer writes data into a physical block and multi-plane write in which the writer writes data into the associated physical blocks of multi planes simultaneously; and a discriminator which discriminates which one of a set of associated physical blocks is subjectable to the plane-by-plane write when the set of the associated physical blocks to which the multi-plane write is disabled occurs, wherein when the associated physical blocks are detected by the first searcher, the writer performs the multi-plane write to the detected associated physical blocks, when the associated physical blocks are not detected by the first searcher, the writer performs the plane-by-plane write to the physical blocks detected by the second searcher, the second searcher has a non-set good block table having a list of physical block addresses of free physical blocks to which the multi-plane write is disabled but the plane-by-plane write is enabled, and when a set of physical blocks to which the multi-plane write is disabled occurs, the discriminator writes a physical block address of any physical block which is discriminated as being subjectable to the plane-by-plane write into the non-set good block table.

* * * * *